Patented June 17, 1924.

1,497,690

UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

METHOD FOR PRODUCING HYDROCYANIC ACID.

No Drawing. Application filed August 27, 1921. Serial No. 496,046.

*To all whom it may concern:*

Be it known that I, OTTO LIEBKNECHT, a citizen of the Republic of Germany, and resident of Frankfort-on-the-Main, Germany, have invented a new and useful Method for Producing Hydrocyanic Acid, of which the following is a specification.

This invention relates to the manufacture of hydrocyanic acid and has for its object to produce a more efficient method of making hydrocyanic acid.

Hydrocyanic acid has been made heretofore by the treatment of a cyanide solution with acids or acid salts with the application of external heat. Such a process is subject not only to the inefficient step of applying external heat but also possesses other disadvantages such as the inconvenience of handling acids. The present invention overcomes these disadvantages.

If anhydrous salts of metals whose bases form unstable cyanides are treated with suitable cyanides in the presence of water, the hydration heat of said metal salts is sufficient to drive off the hydrocyanic acid. The reaction may be helped by the use of the hydration heat of another salt which does not disturb the reaction of the cyanides and metal salts, in fact the necessary heat for driving off the hydrocyanic acid may be obtained from the hydration of either or both the metal salt or the other salt which will not disturb the reaction. When the cyanides used in the reaction are solid and in finely divided form with the metal salts anhydrous, or nearly so, no hydrocyanic acid is formed, but on the addition of water in the right amount an almost stoichiometric quantity of hydrocyanic acid is produced. The addition of a little external heat may be desirable to obtain very good results.

Salts of aluminum or magnesium are especially suitable in this process and particularly their chlorides or sulphates. The aluminum salts are notable for the high heat of hydration produced while the salts of magnesium possess the advantage of being cheap. To increase the heat of hydration a salt such as calcium chloride may be used which has a high heat of hydration yet does not interfere with the reaction. If the metal salt for the reaction be not anhydrous the assisting salt not entering into the reaction may be relied upon to supply the necessary heat of hydration. This assisting salt, by having a high heat of hydration, enables the cyanides, as well as the reaction metal salts, to be used when in solution.

For example: 50 parts by weight of sodium cyanide in finely divided form may be mixed with 70 parts by weight of aluminum sulphate containing 2.5 molecules of water per molecule of $Al_2(SO_4)_3$. This mixture may be either poured into from 120 to 150 parts by weight of water (warm or cold) in a suitable vessel, or the water may be poured over the mixture, when in either case a strong evolution of hydrocyanic acid results and is soon completed.

Increased efficiency and convenience accrue from the application of internal heat in the manner above described.

Claims:

1. The process of making hydrocyanic acid which comprises treating with water a mixture of an alkali metal cyanide and a metal salt in solid state, whose base forms with hydrocyanic acid an unstable cyanide, and which evolves heat on treatment with water.

2. The process of making hydrocyanic acid which comprises treating with water a mixture of an alkali metal cyanide and an aluminum sulphate which is capable of producing heat upon being treated with water.

3. The method of making hydrocyanic acid which comprises the addition of anhydrous calcium chloride to a mixture of an alkali metal cyanide with a metal salt, whose base forms a cyanide unstable in the presence of water.

4. The method of making hydrocyanic acid which comprises the addition of anhydrous calcium chloride to a mixture of sodium cyanide with a metal salt, whose base forms a cyanide unstable in the presence of water.

5. The method of making hydrocyanic acid from an alkali metal cyanide which comprises mixing the following ingredients in about the following relative proportions: 50 parts by weight of sodium cyanide, 70 parts by weight of aluminum sulphate containing 2.5 molecules of water per molecule of $Al_2(SO_4)_3$, 135 parts by weight of water.

6. The method of generating hydrocyanic acid from a mixture of an alkali metal cyanide and a metallic salt, whose base forms with hydrocyanic acid an unstable cyanide in the presence of water, the necessary heat being supplied by the addition of an auxiliary anhydrous salt which evolves heat on treatment with water and which does not interfere with the reaction.

7. The method of making hydrocyanic acid which comprises mixing sodium cyanide and an aluminum sulphate which is capable of producing heat upon being treated with water and treating the mixture with water.

In testimony whereof I have signed my name to this specification in the presence of two subscribing witnesses.

OTTO LIEBKNECHT.

Witnesses:
    THEODOR POHL,
    EMIL SCHILLIR.